United States Patent [19]

Faupell

[11] Patent Number: 4,970,857
[45] Date of Patent: Nov. 20, 1990

[54] ENERGY ABSORBER FOR TRANSLATING PORTIONS OF ROCKET MOTOR CASES USING HONEYCOMB

[75] Inventor: Lawrence C. Faupell, North Logan, Utah

[73] Assignee: Thiokol Corporation, Ogden, Utah

[21] Appl. No.: 308,275

[22] Filed: Feb. 9, 1989

[51] Int. Cl.$^5$ ............................................. F02K 9/26
[52] U.S. Cl. .................................. 60/254; 239/265.31
[58] Field of Search .......................... 60/254, 228, 233; 188/371, 376; 239/265.27, 265.37; 102/381

[56] References Cited

U.S. PATENT DOCUMENTS

| | | | |
|---|---|---|---|
| 3,182,449 | 5/1965 | Kerney et al. | 60/39.48 |
| 3,803,838 | 4/1974 | Morgan et al. | 60/254 |
| 3,888,531 | 6/1975 | Straza et al. | 188/376 |
| 4,077,495 | 3/1978 | Chase | 188/376 |
| 4,423,802 | 1/1984 | Botzem et al. | 188/377 |
| 4,484,439 | 11/1984 | Singer et al. | 60/254 |

Primary Examiner—Louis J. Casaregola
Assistant Examiner—Timothy S. Thorpe
Attorney, Agent, or Firm—Gerald K. White; Allen H. Erickson

[57] ABSTRACT

For providing controllable thrust reversal or thrust termination of a rocket motor, a U-band retaining the nozzle assembly to the motor case is broken. This allows the internal motor pressure to move the nozzle assembly backward from the motor case to create a circumferential opening therebetween, through which opening gases can be expelled outward and/or in the forward direction to terminate or reverse the thrust. When the U-band is broken, the high internal motor pressure may exert such a high force on the nozzle assembly as it is moved backward that the bolts or other means attaching the nozzle assembly to the rest of the missile may be broken and cause uneven gas expulstion. Uneven gas expulsion may cause undesirable changes in trajectory. By the use of honeycomb structures in association with the bolts or other attachment means, the energy exerted on the nozzle assembly is gradually absorbed, preventing breakage of the connecting parts. The gradual absorption of energy ensures that nozzle assembly will be moved backward evenly and not become cocked on the bolts or other connecting means, which is essential for proper thrust termination or thrust reversal.

15 Claims, 1 Drawing Sheet

ENERGY ABSORBER FOR TRANSLATING PORTIONS OF ROCKET MOTOR CASES USING HONEYCOMB

BACKGROUND OF THE INVENTION

1. Field of the Invention

This invention relates to rocket motors and more particularly to rocket motors involving controllable thrust reversal or thrust termination.

2. Description of the Prior Art

Controllable thrust reversal or thrust termination of a rocket motor may be accomplished by moving the nozzle assembly backward from the motor case. Such movement produces an annular opening between the nozzle assembly and the motor case through which gases can be expelled outward and/or in the forward direction to terminate or reverse the thrust.

A problem encountered in the prior art is that when the mechanism maintaining the nozzle assembly in contiguous attached relation with the motor case is broken, the high internal motor pressure may exert such a great force on the nozzle as it is moved backward that bolts or other means holding or attaching the nozzle assembly to the rest of the rocket motor may be broken. The resulting uneven gas expulsion may cause undesirable changes in trajectory of the rocket.

Thus, there is a need and a demand for a retention mechanism or structure that will absorb the energy exerted on the nozzle assembly upon movement backward thereof from the motor case for effecting termination or reversal of the thrust, thereby preventing breakage or deformation of the connecting parts and minimizing the possibility of gas expulsion in an uneven or otherwise undesirable manner.

SUMMARY OF THE INVENTION

A general object of the invention is to provide an efficient and inexpensive solution to the problems caused by case/case or case/nozzle translation of rocket motors, that is, breakage of the parts holding the sections together, by absorbing the energy in a controlled fashion to prevent breakage and retain all parts.

A specific object of the invention is to provide, in a rocket motor, an energy absorbing connecting structure for translating motor case and nozzle assembly rocket motor portions, for absorbing the energy released, when a mechanism employed to retain the forward end of the nozzle assembly in contiguous relation with the aft end of the motor case is broken, to terminate or reduce the thrust.

Another specific object of the invention is to provide in a rocket motor such an energy absorbing connecting structure that is operative gradually to absorb such released energy that is exerted on the nozzle assembly to ensure that the nozzle assembly will move backward evenly relatively to the motor case and not become cocked on the connecting structure, whereby to preclude uneven gas expulsion through the opening created between the forward end of the nozzle assembly and the aft end of the motor case.

These and other objectives are achieved in accordance with the invention wherein, in one embodiment thereof, a tubular shaped structure or member preferably made of "honeycomb" surrounds each, or if desired, some only, of a plurality of circumferentially uniformly spaced connecting or guide bolts that are provided in cooperative relation with the nozzle assembly for controlling and limiting the backward movement thereof relatively to the rocket motor case.

Honeycomb is a material that is commercially available from Hexcel Products Inc., Berkeley, California. It may be made of aluminum, Monel metal, or stainless steel, or any metallic material. The choice of material is a design consideration determined by the parameters of the application. A basic characteristic of honeycomb is high strength-to-weight ratio when used as a core in a structural sandwich involving another material in foil or web form and thus combining the properties of honeycomb with those of the other material.

A characteristic of honeycomb that renders this material, when used by itself as an energy absorber, particularly suitable for the purposes of the present invention is the ability thereof to absorb great energy loads at predetermined constant rates. There is, as a consequence, a gradual absorption of energy uniformly around the circumference of the nozzle assembly that ensures backward movement thereof evenly with respect to the motor case with little or no tendency for the nozzle assembly to become cocked on the guide bolts or other connecting means.

The honeycomb members associated with the guide bolts are crushed as the nozzle assembly is forced backward relatively to the aft end of the rocket motor case by the gas under high pressure gas in the combustion chamber. This action occurs when a V-band which holds the nozzle assembly in contiguous relation to the aft end of the motor case is broken. That is to say, at the desired time of thrust reversal or thrust termination, the V-band is intentionally broken. This results in the nozzle assembly being moved backward relatively to the motor case by the force of the high pressure rocket motor gas. The tubular honeycomb members which are uniformly spaced apart are crushed at a predetermined constant rate during such backward movement, gradually absorbing a substantial portion of the released energy effecting such movement and thus causing the nozzle assembly to be moved backward evenly in a controlled manner.

Alternatively, a honeycomb member comprising a single circumferential part or ring through which all of the guide bolts pass may be employed instead of the plurality of tubular honeycomb members.

The various features of novelty which characterize the invention are pointed out with particularity in the claims annexed to and forming a part of this specification. For a better understanding of the invention, its operating advantages and specific objects attained by its use, reference is made to the accompanying drawings and descriptive matter in which a preferred embodiment of the invention is illustrated.

BRIEF DESCRIPTION OF THE DRAWINGS

Having summarized the invention, a detailed description follows with reference being made to the accompanying drawings which form part of the specification, of which.

DESCRIPTION OF THE PREFERRED EMBODIMENT

Figure 1:
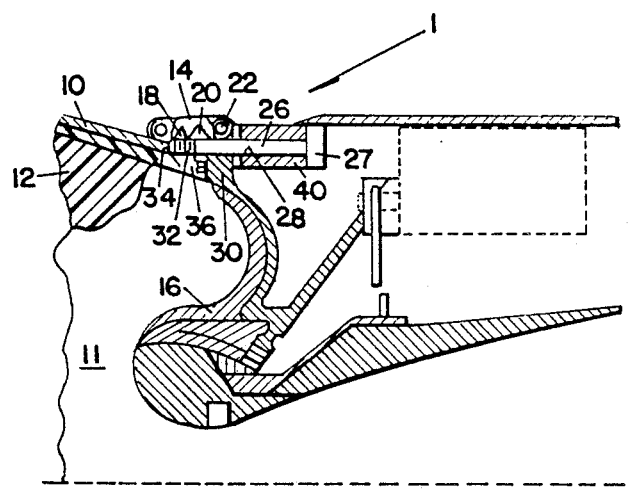
FIG. 1 is a fragmentary longitudinal sectional view of one embodiment of the invention employing a V-band holding a nozzle assembly attached in contiguous relation to a rocket motor case with a tubular shaped honeycomb energy absorbing member surrounding or embracing each of a plurality of guide bolt connectors.
Figure 2:
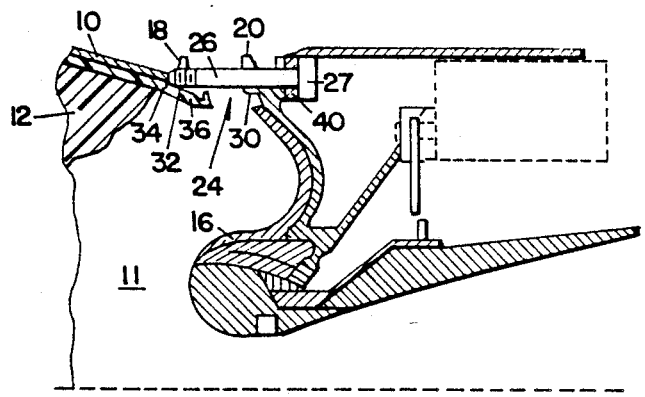
FIG. 2 is a view similar to FIG. 1 showing the nozzle assembly forced backward to an extended position in spaced relation to the motor case, in which position the illustrated tubular honeycomb member surrounding the guide bolt connector is crushed.

Referring to the drawings, there is illustrated in FIG. 1 a rocket motor 1 comprising a case 10, which case 10 encloses a combustion chamber 11 containing a propellant 12. Mounted on the aft end of case 10 and attached thereto by a conventional circumferential U-band 14 is a nozzle assembly 16. The V-band 14 encircles a bead 18 at the aft end of case 10 and also a bead 20 at the adjacent forward portion of the nozzle assembly 16 and normally holds the nozzle assembly 16 to the case 10. An explosive or other m indicated at 22 is provided for breaking the V-band 14 thereby to allow the nozzle assembly 16 to be moved backward, that is aft, with respect to case 10, by the pressure of gas in the combustion chamber 11 when it is desired to terminate or reverse the thrust. Upon such movement aft of the nozzle assembly 16, as shown in FIG. 2, an annular opening 24 is produced between the aft end of case 10 and the forward end of nozzle assembly 16. Gases in combustion chamber 11 can be expelled outward and/or in the forward direction by any suitable means through the annular opening 24 to terminate or reverse the thrust.

A plurality of guide bolts 26 (one only of which is shown in the drawing) are uniformly distributed around the periphery of the nozzle assembly 16. The guide bolts 26 are provided for guiding and predetermining, that is, limiting, the extent to which the nozzle assembly 16 is allowed to move backward with respect to the motor case 10. Each of the guide bolts 26 has a head 27 at one end and extends through an associated one of a plurality of holes 28 provided on a circumferential flange 30 at the forward end of the nozzle assembly 16, on which flange 30 the bead 20 is formed. At the other end of each of the guide bolts 26 is a thread 32 which fits into and is secured in a respectively associated one of a plurality of appropriately positioned taps 34 provided in a flange 36 provided at the aft end of the motor case 10. Bead 18, as shown, is formed on flange 36.

Surrounding each of the guide bolts 26 between the head 38 thereof and the hole 28 on the forward end of the nozzle assembly 16 is a tubular honeycomb member 40, as previously described herein.

It is contemplated that, if desired, such a tubular honeycomb member 40 may be provided in surrounding relation with some only instead of all of the guide bolts 26, being uniformly distributed, however, around the circumference of the flange 30 of nozzle assembly 16.

Figure 3:
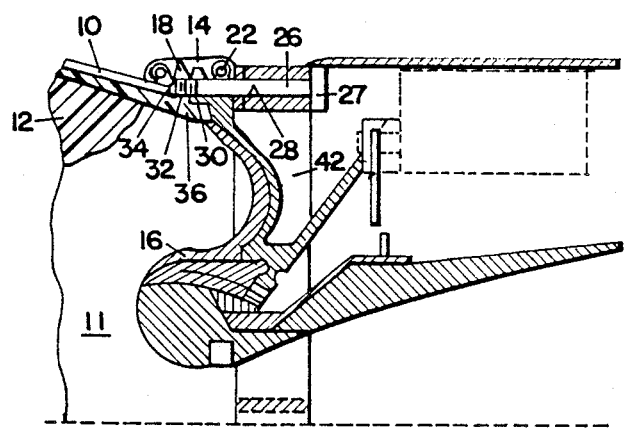
FIG. 3 is a fragmentary schematic illustration of an alternative form or unitary honeycomb energy absorbing member that advantageously may be employed in the embodiment of FIG. 1 instead of a tubular honeycomb member individual to each of the guide bolt connectors.

Alternatively, the honeycomb energy absorbing member may comprise a unitary circumferential structure or ring 42, as schematically illustrated in FIG. 3, through suitable openings of which ring 42 all of the guide bolts 26 pass.

In each of the described embodiments of the invention, the honeycomb members 40 or 42 are crushed as the nozzle assembly is forced backward by the high gas pressure in the combustion chamber 11. Specifically, at the desired time of separation, the explosive or other means 22 is activated to break the V-band 14. Being released from the position of close or contiguous relation with respect to the motor case 10, the nozzle assembly 16 is forced backward by the gas pressure in chamber 11 to the position shown in FIG. 2, crushing, in the process, the honeycomb members 40 which embrace the bolts 26. The resulting gradual absorption of energy by the honeycomb members 40 ensures that the nozzle assembly 16 will be moved backward evenly and not become cocked or tilted on the bolts 26.

Thus, in accordance with the invention, there has been disclosed an efficient, inexpensive energy absorbing connecting structure that is operative to gradually absorb the energy exerted on a nozzle assembly, preventing breakage of the connecting parts and consequent uneven gas expulsion that may c undesirable changes in trajectory, when the V-band employed to retain the nozzle assembly in contiguous relation with the aft end of a rocket motor case is broken for effecting thrust termination or thrust reversal. The gradual absorption of energy ensures that the nozzle assembly 16 will be moved backward evenly with respect to the aft end of the motor case 10 and not become cocked on the connecting bolts 26 or other connecting means, which is essential to proper thrust termination or thrust reversal. Depending upon the particular case-nozzle joint configuration, the energy absorbing tubular honeycomb members or the unitary honeycomb member described may be attached in one of several ways, as understood by those skilled in the art, to absorb the energy of translation in a gradual fashion and allow containment of the nozzle assembly (or other part) on its connecting bolts 26 or other guide members.

Although the invention has been illustrated in connection with a rocket motor case/nozzle joint, those skilled in the art will understand that it may advantageously be applied to case/case joints for multi-stage rockets where thrust termination or thrust reversal is required.

In another aspect thereof, the invention provides a solution for the problems caused by case/case translation or case/nozzle translation, that is to say, breakage of parts holding the sections together, by absorbing the energy in a controlled manner to prevent breakage and to retain all parts.

With this description of the invention in detail, those skilled in the art will appreciate that modifications may be made to the invention without departing from its spirit. Therefore, it is not intended that the scope of the invention be limited to the specific embodiments illustrated and described. Rather, it is intended that the scope of the invention be determined by the appended claims and their equivalents.

What is claimed is:

1. A rocket motor including an energy absorber for translating portions thereof comprising:
   a first rocket motor portion having a first circumferential flange,
   a second rocket motor portion having a second circumferential flange that matches said first circumferential flange,
   one of said first and second rocket motor portions containing rocket motor gas generating means,
   first holding means for fixedly attaching said first circumferential flange to said second circumferential flange in coaxial contiguous relationship to hold said first and second rocket motor portions in cooperative relation, said first holding means being breakable and upon being broken, allowing the pressure of generated gas in said one rocket motor portion to separate said first and second circumferential flanges and thereby said first and second rocket motor portions to produce an annular opening therebetween, through which opening generated gas can be expelled, crushable metallic means, and second holding means for holding said first and second rocket motor portions in attached relation, said second holding means being operable upon breakage of said first holding means to limit the extent of separation of said first and second circumferential flanges and including said crushable metallic means for absorbing in a controlled manner the energy of the generated gas effecting such separation thereof thereby to prevent breakage of said first and said second rocket motor portions and to retain the attachment therebetween.

2. A rocket motor including an energy absorber for translating portions thereof as defined by claim 1 in said second holding means includes a plurality of bolt means associated with said first and second flanges with said bolt means being uniformly distributed around the circumferences thereof and passing completely through at least one of said flanges, and wherein said crushable metallic means is associated with some at least of said bolt means, uniformly around the circumferences of said first and second flanges, and is so positioned with respect to such bolt means associated therewith as to be operable to gradually absorb the energy of the generated gas exerted to separate said first and second flanges upon breakage of said first holding means.

3. A rocket motor including an energy absorber for translating portions thereof as defined by claim 2 wherein said crushable metallic means is in the form of a unitary ring positioned concentrically with respect to said first and said second flanges and of such dimension that all of said bolt means pass through said crushable metallic means.

4. A rocket motor including an energy absorber for translating portions thereof as defined by claim 2 wherein said crushable metallic means is in the form of a plurality of tubular crushable metallic members with at least one such member positioned in embracing relationship with said some at least of said bolt means.

5. A rocket motor including an energy absorber for translating portions thereof as defined in claim 4 wherein said tubular crushable metallic members are made of honeycomb.

6. A rocket motor including an energy absorber for translating portions thereof as defined by claim 2 wherein said crushable metallic means is in the form of a plurality of tubular crushable metallic members with at least one such member positioned in embracing relation with each of said plurality of bolt means.

7. A rocket motor including an energy absorber for translating portions thereof as defined in claim 6 wherein said tubular crushable metallic members are made of honeycomb.

8. A rocket motor including an energy absorber for translating portions thereof as defined in claim 1 wherein said first rocket motor portion comprises a case containing propellant and said second rocket motor portion comprises a nozzle assembly.

9. A rocket motor including an energy absorber for translating portions thereof comprising:

a first rocket motor portion having a first circumferential flange, a second rocket motor portion having a second circumferential flange that matches said first circumferential flange, one of said first and second rocket motor portions containing rocket motor gas generating means, first holding means for fixedly attaching said first circumferential flange to said second circumferential flange in coaxial contiguous relationship to hold said first and second rocket motor portions in cooperative relation, said first holding means being breakable and upon being broken, allowing the pressure of generated gas in said one rocket motor portion to separate said first and second circumferential flanges and thereby said first and second rocket motor portions to produce an annular opening therebetween, through which opening generated gas can be expelled, crushable metallic means, and second holding means for holding said first and second rocket motor portions in attached relation, said second holding means to limit the extent of separation of said first and second circumferential flanges and including said crushable metallic means for absorbing in a controlled manner the energy of the generated gas effecting such separation thereof thereby to prevent breakage of said first and said second rocket motor portions and to retain the attachment therebetween, wherein said first rocket motor portion comprises a case containing propellant and said second rocket motor portion comprises a nozzle assembly, wherein said case includes said first circumferential flange and said nozzle assembly includes said second circumferential flange, wherein said first holding means comprises a V-band, wherein said second holding means includes a plurality of bolt means associated with said first and second circumferential flanges with said bolt means each having a head at one end and a screw thread at the other end and being uniformly distributed around the circumferences thereof and with each of said bolt means passing trhrough an individually associated hole in said second circumferential flange into an individually associated tap in said first circumferential flange, and wherein said crushable metallic means is made of honeycomb and is positioned in cooperative relationship with some at least of said bolt means, uniformly around the circumferences of said first and second flanges, between the heads thereof and said second circumferential flange, whereby, upon breakage of said V-band, the energy of the generated gas expelled to separate said nozzle assembly from said case and to move said nozzle assembly backward relatively thereto is gradually absorbed by said crushable metallic means thereby preventing breakage of said case and said nozzle assembly with said nozzle assembly being retained to said case but separated therefrom with an annular opening formed therebetween.

10. A rocket motor including an energy absorber for translating portions thereof as defined by claim 9 wherein said crushable metallic means is made of honeycomb and is positioned in cooperative relationship with all of said bolt means.

11. A rocket motor including an energy absorber for translating portions thereof as defined by claim 9 wherein said crushable metallic means comprises a plurality of tubular honeycomb members with at least one such tubular honeycomb member positioned in embracing relationship with some at least of said bolt means, uniformly around the circumferences of said first and second flanges, between the head thereof and said second circumferential flange, whereby upon breakage of said V-band, the energy of the generated gas exerted to separate said nozzle assembly from said case and to move said nozzle assembly backward relatively thereto is gradually absorbed by the tubular honeycomb members being crushed between said second circumferential flange and the heads of the bolt members having a honeycomb member positioned in embracing relationship therewith.

12. A rocket motor including an energy, absorber for translating portions thereof as defined in claim 11 wherein a tubular honeycomb member is positioned in embracing relationship with each of said bolt means.

13. An energy absorber for translating portions of a rocket motor comprising:
    a first rocket motor portion having at an end thereof a first circumferential flange,
    a second rocket motor portion having at an end thereof a second circumferential flange that matches said first circumferential flange,
    one of said first and second rocket motor portions containing rocket motor gas generating means,
    first holding means for fixedly attaching said first circumferential flange to said second circumferential flange in coaxial contiguous relationship to hold said first and second rocket motor portions in cooperative relation, said first holding means being breakable, and upon being broken, allowing the pressure of generated gas in said one rocket motor portion to move said first and second rocket motor portions apart to form an annular opening between said first and second circumferential flanges, through which opening generated gas can be expelled,
    crushable metallic means formed of honeycomb, and
    second holding means for holding said first and second rocket motor portions in attached relation, said second holding means being operative upon breakage of said first holding means to limit the extent of separation of said first and second rocket motor portions and including said crushable metallic means for absorbing in a controlled manner the energy of the generated gas effecting such separation thereby to prevent breakage of said first and said second rocket motor portions and to retain the attachment therebetween.

14. An energy absorber for translating portions of a rocket motor as defined in claim 13 wherein said crushable metallic means is in the form of a unitary ring of honeycomb having substantially the same circumferential dimension as said first and said second circumferential flanges and being positioned concentrically therewith in contiguous relationship with one only of said circumferential flanges, and
    wherein said second holding means includes a plurality of bolt means associated with said first and said second circumferential flanges with said bolt means each having a head at one end and a screw thread at the other end and being uniformly distributed around the circumferences thereof and with each of said bolt means passing through an individually associated hole in said one circumferential flange into an individually associated tap in the other one of said circumferential flanges,
    said unitary ring of honeycomb being positioned between said one circumferential flange and the heads of said bolt means, 15. An energy absorber for translating portions of a rocket motor as defined in claim 13 wherein said crushable metallic means is in the form of a plurality of tubular members,
    and wherein said second holding means includes a plurality of bolt means associated with said first and said second circumferential flanges with said bolt means each having a head at one end and a screw thread at the other end and being uniformly distributed around the circumferences thereof with each of said bolt means passing through an individually associated hole in one of said circumferential flanges into an individually associated tap in the other one of said circumferential flanges,
    at least one of said plurality of tubular members being positioned between said one circumferential flange and some, at least, of the heads of said bolt means, being uniformly distributed around the circumference of said one circumferential flange.

* * * * *